Feb. 16, 1965    R. S. SCHULTZ ETAL    3,170,010
METHOD OF MOLDING PRE-EXPANDED PLASTIC BEADS
Filed Dec. 28, 1961    2 Sheets-Sheet 2

INVENTOR'S
ROBERT STEPHEN SCHULTZ
EUGEN FRANZ POLKA
JEROME ALFRED CHERNEY
BY Leland R. McCann
George W. Reiber
ATTORNEYS 3,170,010
METHOD OF MOLDING PRE-EXPANDED PLASTIC BEADS
Robert Stephen Schultz, Somerville, N.J., and Eugen Franz Polka, Algonquin, and Jerome Alfred Cherney, Fox River Grove, Ill., assignors to American Can Company, New York, N.Y., a corporation of New Jersey
Filed Dec. 28, 1961, Ser. No. 162,862
4 Claims. (Cl. 264—51)

The present invention relates to a method of molding cellular thermoplastic articles by fusing and cooling pre-expanded plastic beads in a mold and has particular reference to controlling the fusing and cooling of the beads in such a manner as to provide for rapid molding of the article.

The manufacture of pre-expanded thermoplastic beads, commonly termed foamable plastics, and the production of articles therefrom by confining a quantity of the beads in a mold cavity and subjecting them while so confined to heat and cooling, is well known in the art. The heating of the beads causes them to coalesce with some additional expansion into a cellular mass conforming to the shape of the mold cavity and having a closed cell structure.

However this closed cell structure is fairly porous and the exterior surfaces of the finished article are usually rough and soft.

Where a smooth and fairly hard surface is required on the finished article it has been found that the mold is required to be heated to a substantially high temperature. Also before the finished article may be removed from the mold, this substantially high temperature must be largely dissipated by a cooling medium, all of which tends to produce a slow manufacturing cycle which has proved unprofitable and thereby unsatisfactory for the commercial production of articles of this type.

It is an object of the instant invention to provide a method of producing articles of foamable plastics by reducing the manufacturing time cycle to the extent that such articles may be profitably manufactured.

Another object is the provision of method steps for accurately controlling the heating and cooling actions to produce rapid manufacture of articles.

Numerous other objects and advantages of the invention will be apparent as it is better understood from the following description, which, taken in connection with the accompanying drawings, discloses a preferred embodiment thereof.

In the instant invention a quantity of pre-expanded thermoplastic beads are confined in a mold cavity and are fused together by controlled heat and are then cooled by a cooling medium. Heat by conduction and also by injection are combined and utilized in a separated but controlled order with a predetermined overlapping of the heating and cooling cycle to provide for high speed operation on the beads and a greatly reduced time cycle for the article production.

In this invention separable mold parts utilized to shape the article to be produced, are being heated by conductive heating fluids while the mold parts are opening and closing to eject a produced article. As soon as the preheated mold parts are closed, the mold cavity is filled with the thermoplastic beads which immediately receive heat from the mold parts to start the bead heating cycle. Upon filling of the mold with the beads, an additional heating medium, separate from the mold pre-heating medium, is momentarily injected into the mold cavity under pressure to effect with the heat of the molds, almost instant fusion of the beads, and to thereby produce the hard smooth surfaces on the article.

While this injection heating is taking place, the mold pre-heating medium is cut off and the molds are subjected to the cooling affect of a cooling medium before they are opened. There is thus an overlapping of the combined mold conditioning mediums and the fusing or injected medium so as to provide for a short commercially profitable manufacturing cycle while at the same time producing a superior article.

Referring to the drawings.

Figure 1:
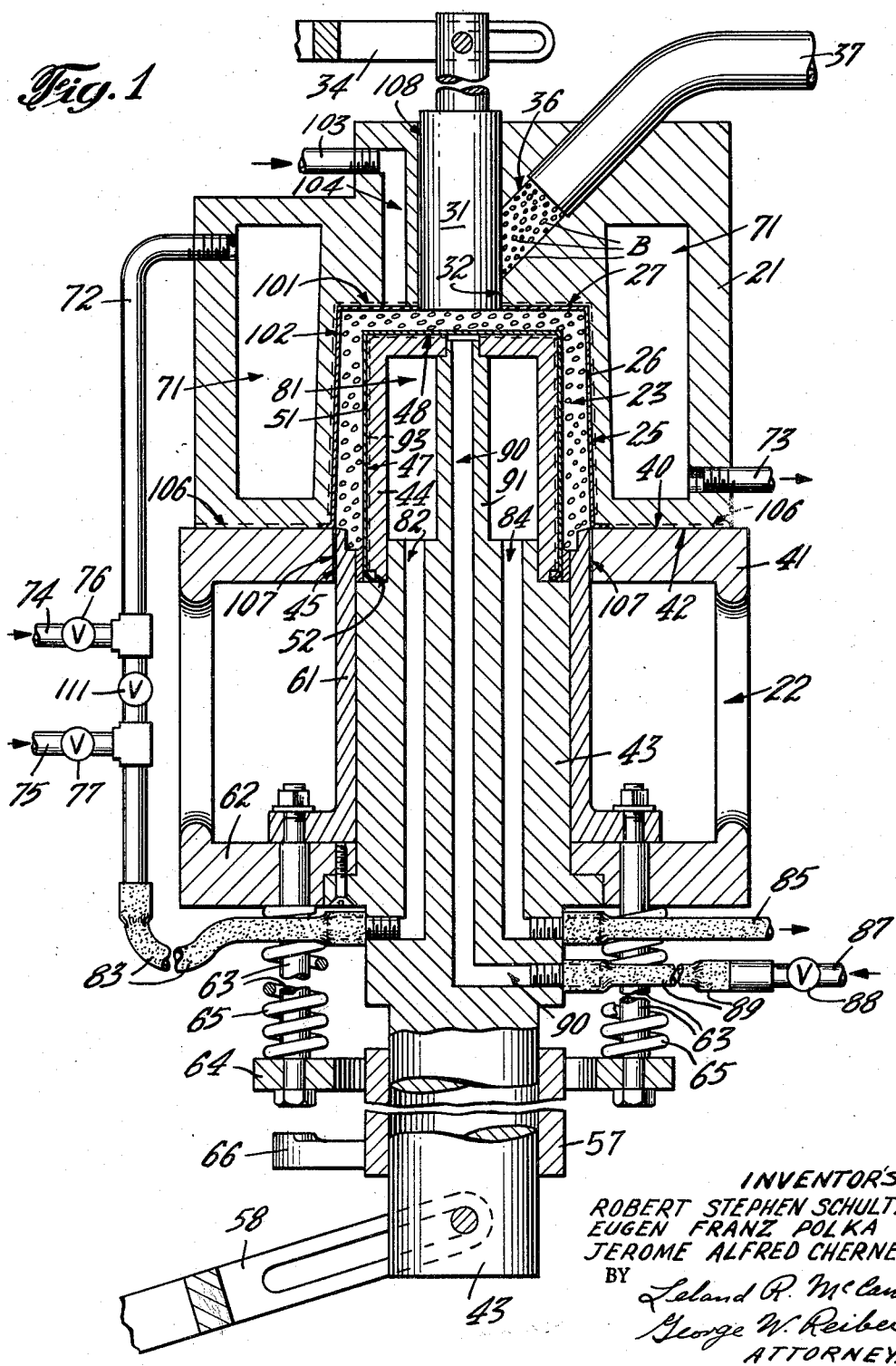
FIGURE 1 is a sectional view of a form of apparatus embodying the instant invention and for carrying out the method steps of the invention.
Figure 5:
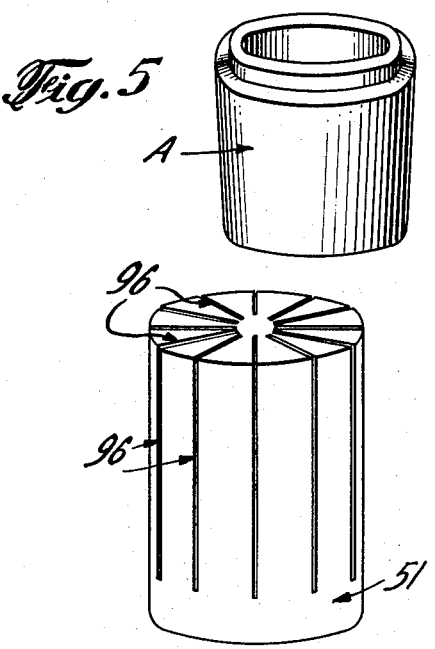
FIGURE 5 is a perspective view of an article produced in the apparatus and by the method steps of the invention.

As a preferred and exemplary embodiment of the instant invention, the drawings disclose an apparatus for carrying out the method steps of producing a relatively thick walled open top container A (FIG. 5) by fusing together a quantity of confined pre-expanded foamable thermoplastic beads B (FIG. 1).

One form of apparatus, as disclosed in the drawings, for producing articles such as the container A includes a mold cavity element or member 21 and a mold core element or member 22, which are movable relative to each other, from an open or separated position into a closed position as shown in FIG. 1, to provide a closed cavity 23 of the shape and size of the article to be produced.

The mold cavity element 21 preferably is a block shaped member having a cavity or recess 25 defined by a side wall 26 and a top wall 27, the cavity being of a shape and size substantially equal to the exterior surface of the article to be produced. When the mold elements 21, 22 are closed as shown in FIG. 1, the cavity walls 26, 27 form the outer defining walls of the closed cavity 23 in which the article A is produced.

A quantity of the pre-expanded beads B sufficient to fill the closed cavity 23 is fed into the cavity in any suitable manner. FIG. 1 of the drawings shows one means for effecting this feeding operation, which means comprises a plunger 31 moveable within a feeding passageway 32 formed in the top of the mold cavity element 21 and communicating with the element cavity 25 in the cavity defining top wall 27. The plunger 31 is shifted in the passageway 32 in any suitable manner and at the proper time, such as by a lever arm 34 connected to the plunger and operated by cam or other means.

The plunger 31 normally blocks off the feed end of a conduit 36 formed in the top of the mold cavity element 21. The feed end of the conduit 36 communicates with the passageway 32 while its opposite end connects with a feed pipe 37 which leads from a suitable source of the pre-expanded beads B.

When the plunger 31 is in a closed position as shown in FIG. 1, it cuts off the supply of beads B from the closed cavity 23 and when in an open or raised position, uncovers the feed end of the conduit 36 and permits the beads B to flow into the closed cavity 23.

The mold core element or member 22 is located adjacent the cavity side of the mold cavity element or member 21 so that relative movement may be effected between the elements. The drawings illustrate the mold core element 22 as being moveable relative to the mold cavity element 21 but this relation may be reversed if desired. For this purpose the mold core element 22 comprises a reciprocable mounting cage 41 (FIG. 1) having a flat top surface 42 which is adapted to engage against a corresponding flat surface 40 of the mold cavity element 21.

The mounting cage 41 preferably carries and is secured to a conduit member 43 which is disposed in axial alignment with the cavity 25 in the mold cavity element 21. The upper end of the conduit member 43 is fitted with a core 44 which extends through an opening 45 in the top of the mounting cage 41 and when the mold parts are closed, projects up into the cavity 25 of the mold cavity element 21 as shown in FIG. 1. This core 44 is generally of the size and shape of the inner dimensions of the article A to be produced and is defined by a side wall 47 and a top wall 48, see also FIG. 2. The core 44 preferably is provided with a thin sheet metal overcap or shell 51 which preferably fits tight over the core for a purpose to be hereinafter explained. The side walls and top wall of this overcap define the inner surfaces of the closed cavity 23 which confines the pre-expanded beads B when the mold parts are closed as shown in FIG. 1.

Figure 2:
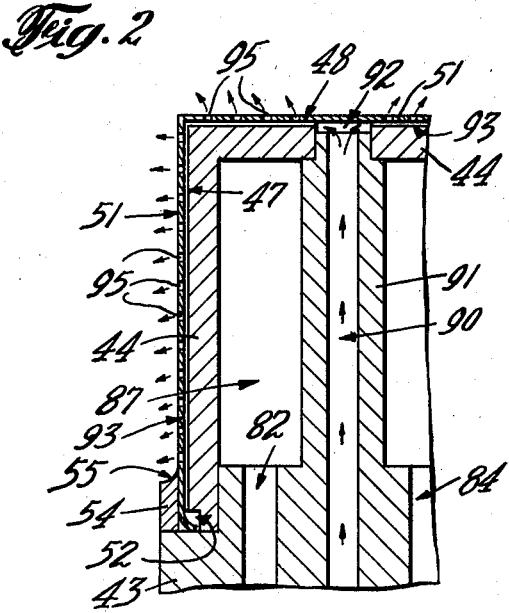
FIGURE 2 is an enlarged fragmentary sectional view of a mold core member used in the apparatus shown in FIG. 1.

The lower edge of the overcap 51 preferably is crimped into a recess 52 in the lower end of the core 44 and is held in place by a ring 54 which tightly surrounds the lower ends of the overcap and the core as best shown in FIG. 2. A curved top face 55 of the ring 54 forms a defining surface of the closed cavity 23. The outer surface of the ring 54 preferably is flush with the outer surface of the conduit member 43.

The lower end of the conduit member 43 extends down through a support bearing 57 (FIG. 1) and below this bearing the conduit member is connected to a lever arm 58 which may be actuated in any suitable manner to open and close the mold core element 22 relative to the mold cavity element 21 as hereinbefore mentioned.

When the mold core element 22 moves away from the mold cavity element 21 to open the mold parts, an article A produced in the mold is automatically ejected. For this purpose an ejector sleeve 61 surrounds the conduit member 43 and is slideable therealong. The upper end of the ejector sleeve 61 extends through the opening 45 in the mounting cage 41 and is contoured to fit adjacent the mold cavity 25 and as such to provide a defining wall of the closed cavity 23.

The lower end of the ejector sleeve 61 normally is supported on a bottom wall 62 of the mounting cage. The sleeve is secured to a plurality of actuating rods 63 which extend through the bottom wall 62 and at their lower ends are attached to an actuating ring 64. Coil springs 65 around the rods 63 and interposed between the bottom wall 62 and the ring 64 yieldably hold the ejector sleeve 61 in place.

When the mold core element 22 moves down after a product forming operation, the actuating ring 64 engages against a stop lug 66 projecting outwardly from the bearing 57 at a predetermined location and thus arrests the downward movement of the ejector sleeve 61 while the mounting cage 41 and the conduit member 43 continue to descend to a predetermined level. Thus, the ejector sleeve 61 arrests the downward travel of the article A and strips it off of the core overcap 51 and thereby frees it from the separated mold parts for transfer to any suitable place of deposit.

The heating and cooling of the mold parts and the fusing of the pre-expanded beads B to produce the article A as hereinbefore mentioned is effected by separate mediums. The mold parts are alternately heated and cooled, preferably by fluid mediums such as water, although the heating medium could be steam if desired. For this purpose, the mold cavity element 21 is provided with a temperature control chamber 71 (FIG. 1) which surrounds the cavity 25 and through which the heating and cooling mediums are circulated. The mediums are introduced into the chamber by way of an entrance pipe 72 and are discharged by way of a discharge pipe 73.

The entrance pipe 72 is connected to a hot water or steam pipe 74 and a cold water or other cooling medium pipe 75, both of which lead from suitable sources of their respective mediums. Valves 76, 77 connected into the respective pipes 74, 75 are provided for manual or automatic control of the medium through the respective pipes to the entrance pipe 72.

In a similar manner these same heating and cooling mediums are circulated through a temperature control chamber 81 in the core 44 of the mold core element 22. For this purpose one side of the chamber 81 is connected by a passageway 82 in the conduit member 43 and a connecting flexible tube 83, to the entrance pipe 72. The other side of the chamber 81 is connected by a passageway 84 in the conduit member 43 to a connecting flexible tube 85 which leads to any suitable place of discharge. The hot water medium is maintained at substantially 100° F. to 120° F. while the cooling water medium is maintained at substantially 60° F.

The fusing of the beads B is effected preferably by steam within a range of substantially 60 to 180 pounds per square inch (290° F. to 375° F.) which is kept separated from the mold parts, heating and cooling mediums and therefore maintained under separate control which permits of a simultaneous and overlapping use.

Figure 3:
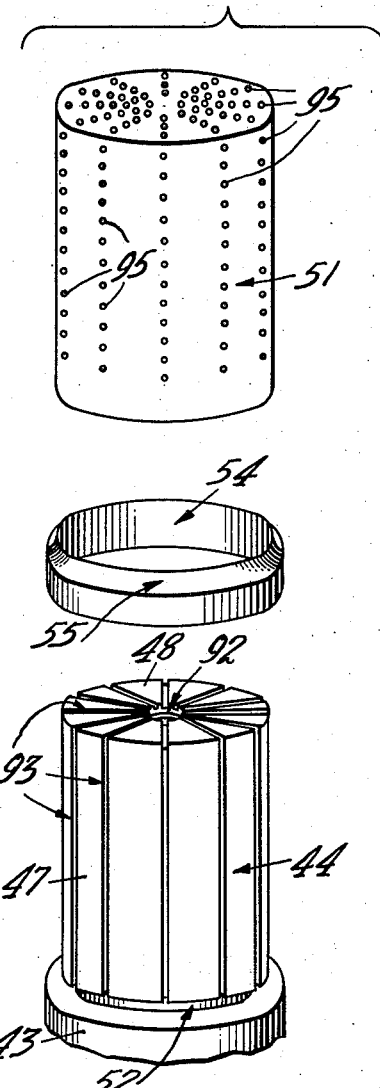
FIGURE 3 is a reduced scale exploded perspective view of the core member parts shown in FIG. 2.

This fusing steam medium is introduced into the overcap 51 on the core 44, by way of a supply pipe 87 (FIG. 1) having a manually or automatically actuated control valve 88. The supply pipe 87 is connected by a flexible tube 89 to a passageway 90 in the conduit member 43. This passageway 90 extends up through a stem 91 formed on the upper end of the conduit member 43 and is sealed against the top wall of the core member 44, as best shown in FIG. 2. The stem 91 thereby seals the steam passageway 90 from the heating and cooling chamber 81. At its upper end the passageway 90 communicates with a port 92 (FIG. 2) which in turn communicates with a plurality of grooves 93 formed in the top wall 48 of the core member 44 and continues down the side wall 47 as best shown in FIGS. 2 and 3.

For cooperation with the steam grooves 93 in the core member 44, the overcap 51 preferably is provided with matching or coinciding lines of very small holes or orifices 95 (FIGS. 2 and 3) which permit the steam to escape into the cavity 23 for the fusing of the beads B.

Figure 4:
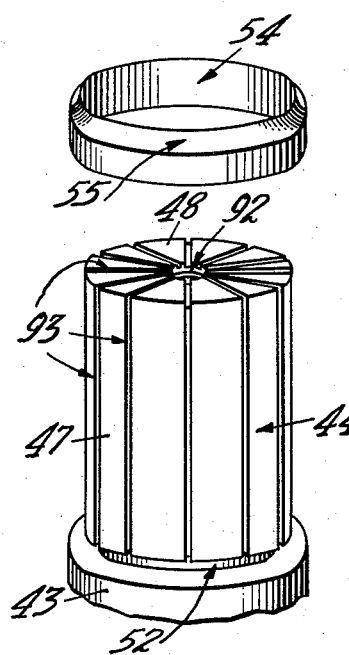
FIGURE 4 is a perspective view of a modified form of one of the parts shown in FIG. 3.

As a modification of the orifices 95 in the overcap 51, the overcap may be provided with matching or coinciding narrow slots 96 (FIG. 4) to permit the escape of the steam into the cavity 23.

As a further modification of the invention it is contemplated that the inner wall surfaces 26, 27 of the cavity 25 in the mold cavity element 21, may be lined with an overcap or shell 101 (FIG. 1), similar to the overcap 51 and containing orifices or slots similar to the orifices 95 and slots 96 to cooperate with grooves 102 in the wall surfaces 26, 27. It is contemplated that steam from the supply pipe 87 would be fed to the grooves 102 by way of a supply pipe 103 (FIG. 1) which connects with a passageway 104 in the top of the mold cavity element 21.

Provision is made for venting the steam from the cavity 23. For this purpose vent grooves 106 (FIG. 1) are provided in the engaging surfaces 40 and 42 of the mold cavity element 21 and the mold core element 22 respectively. Vent grooves 107 are also provided in the opening 45 of the mounting cage 41. If an overcap or shell 101 is used in the mold cavity 25, additional vent grooves 108 are provided in the sides of the passageway 32 in which the plunger 31 operates.

In accordance with the method steps of the invention heat by conduction is applied to the mold parts while they are open and are closing into a closed position to produce a mold cavity. This heat is continued while the cavity is filled with pre-expanded thermoplastic beads. After filling the cavity and while the conduction heat is still continued to maintain the mold parts within a predetermined temperature range, a separate and independent heat is injected into the mold cavity to fuse the beads together. This injected heat cycle overlaps the conduction heat cycle and is continued for a short duration of approximately 1 to 2 seconds. At the expiration of the injection heating cycle, the conduction heating and the injection heating are simultaneously terminated and a cooling cycle immediately started and continued for substantially 11 seconds during which time near the end of the cycle, the mold parts are opened and the cooled fully formed article is ejected and the mold parts ready to close for a repeat cycle.

In such a cycle, closing of the mold parts, while simultaneously heating them to a predetermined temperature, and during the latter part of the heating operation simultaneously applying an injected heat to fuse the beads, is effected in substantially 5 seconds. The cooling portion of the cycle is the longest and is started immediately upon termination of the heating portion of the cycle and with the opening of the mold parts is effected in substantially twelve (12) seconds, making an overall total of substantially seventeen (17) seconds for the complete cycle.

In the invention thus disclosed, the injection heating medium is maintained separate and independent from the mold parts heating and cooling mediums so that no intermixing of the mediums is possible, with the result that full advantage may be taken of the efficiency of the individual mediums and an overlapping of the cycles to reduce the cycle time to a minimum.

As explained above, the preferred manner of heating and cooling the mold parts is by circulating hot and cold water through the temperature control chambers 71 and 82 in the mold cavity member 21 and the mold core member 22. However, it is contemplated this heating and cooling of the mold parts may be varied with equally efficient results.

In one method tried with good results, the mold core element 22 was maintained continuously in a cooled condition by continuously circulating cool water at a constant temperature from the supply pipe 75 through the pipe 72 flexible tube 83, passageway 82 and the control chamber 81. For this purpose a manually or automatically controlled valve 111 is introduced into the pipe 72 between the cool water supply pipe 75 and the hot water supply pipe 74 as shown in FIG. 1. With this valve 111 closed, and valve 77 open a continuous supply of cooling medium is supplied to the mold core member 22. In this method the mold cavity member 21 is alternately heated and cooled as mentioned above by opening the valve 76 during the heating cycle to admit the hot water to the chamber 71, and during the cooling cycle to close the valve 76 and open the valve 111. If steam is used instead of hot water the steam would flow from the supply pipe 74 which would lead to a source of steam instead of hot water. This method appears to give a glossy coat to the outside surface of the article produced.

In another method, both the mold cavity member 21 and the mold core member 22 are maintained at a cool constant temperature by continuously circulating through the control chambers 71, 81 a constant temperature cooling water from the supply pipe 75. In this method the valves 77, 111 are maintained open while the hot water or steam valve 76 is maintained closed.

In each and all of these methods, the injection heating medium remains the same and is maintained separated from and independent of the mold parts heating and cooling mediums.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the method hereinbefore described being merely a preferred embodiment thereof.

We claim:

1. A method of producing cellular thermoplastic articles from pre-expanded plastic beads, which comprises arranging a pair of multi-passaged male and female mold members in concentrically spaced relation to define therebetween a mold cavity communicating with a fluid admission passage and essentially surrounded by concentrically spaced first and second fluid admission chambers isolated from said mold cavity, feeding a quantity of beads into said cavity, introducing a first heated fluid into said first and second chambers, and while said first fluid is in said chambers in heat exchange relation with said mold cavity, introducing a second heated fluid into said passage and into direct contact with said beads to effect fusion thereof.

2. A method of producing cellular thermoplastic articles from pre-expanded plastic beads, which comprises arranging a pair of multi-passaged male and female mold members in concentrically spaced relation to define therebetween a mold cavity communicating with a fluid admission passage and essentially surrounded by concentrically spaced first and second fluid admission chambers isolated from said mold cavity, feeding a quantity of beads into said cavity, continuously introducing a coolant into said first and second chambers, and while said coolant is in said chambers in heat exchange relation with said mold cavity, introducing steam into said passage and into direct contact with said beads to effect fusion thereof.

3. A method of producing cellular thermoplastic articles from pre-expanded plastic beads, which comprises arranging a pair of multi-passaged male and female mold members in concentrically spaced relation to define therebetween a mold cavity communicating with a fluid admission passage and essentially surrounded by concentrically spaced first and second fluid admission chambers isolated from said mold cavity, feeding a quantity of beads into said cavity, continuously introducing a coolant into said first chamber in heat exchange relation with the inner surface of said cavity, directing steam into said second chamber in heat exchange relation with the outer surface of said cavity, and while said coolant and said steam are in heat exchange relation with said inner and outer surfaces of said mold cavity, introducing steam into said passage and into direct contact with said beads to effect fusion thereof.

4. A method of producing a cellular thermoplastic articles as defined in claim 3, in which subsequent to effecting fusion of said beads steam introduction into said second chamber and into said passage is terminated and coolant direction into said second chamber and into said passage.

References Cited in the file of this patent

UNITED STATES PATENTS

| 2,829,400 | Morin | Apr. 8, 1958 |
| 2,907,072 | Jodell | Oct. 6, 1959 |
| 2,954,589 | Brown | Oct. 4, 1960 |
| 3,013,304 | Richie et al. | Dec. 19, 1961 |
| 3,039,146 | Engel | June 29, 1962 |
| 3,042,973 | Brockhues et al. | July 10, 1962 |

OTHER REFERENCES

Koppers booklet, Chpt. 3a, "Equipment Requirements for Molding Dylite Expandable Polystyrene," Bulletin C-9-273, Nov. 15, 1959, all pp.

Koppers booklet, Chpt. 3e, "Mold Techniques and Mold Design," Bulletin C-9-273, Nov. 15, 1959, pp. 16-18.